Figure 1:
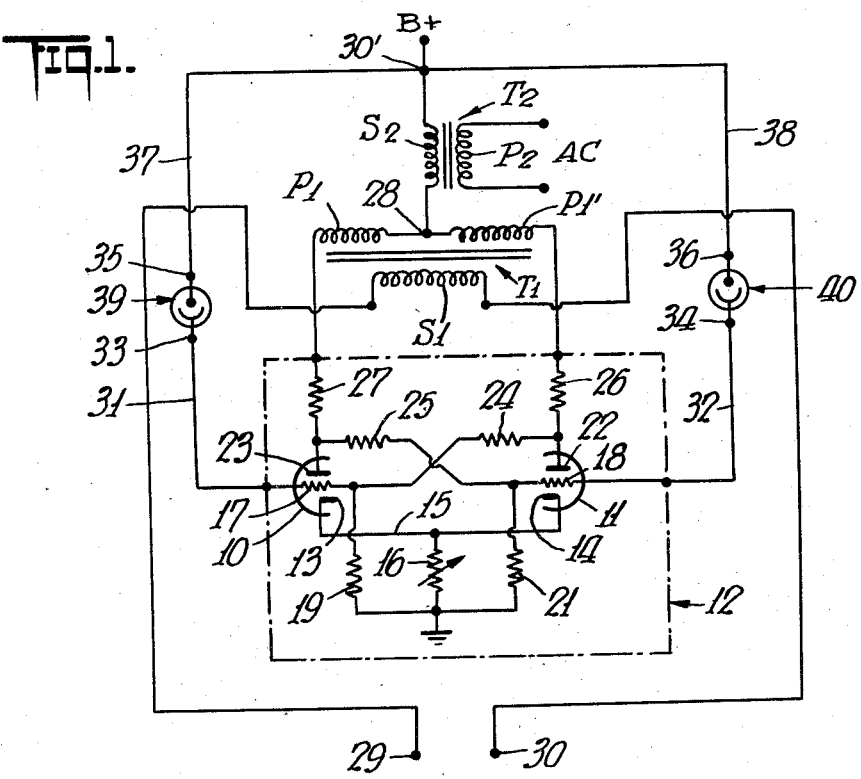

Oct. 28, 1958  J. P. GLASS  2,858,509
ELECTRIC FOLLOWER AND TEST EQUIPMENT
Filed Aug. 12, 1954  2 Sheets-Sheet 1

INVENTOR
*John P. Glass*
BY
*Dean Fairbank & Hirsch*
ATTORNEYS

Oct. 28, 1958     J. P. GLASS     2,858,509
ELECTRIC FOLLOWER AND TEST EQUIPMENT
Filed Aug. 12, 1954     2 Sheets-Sheet 2
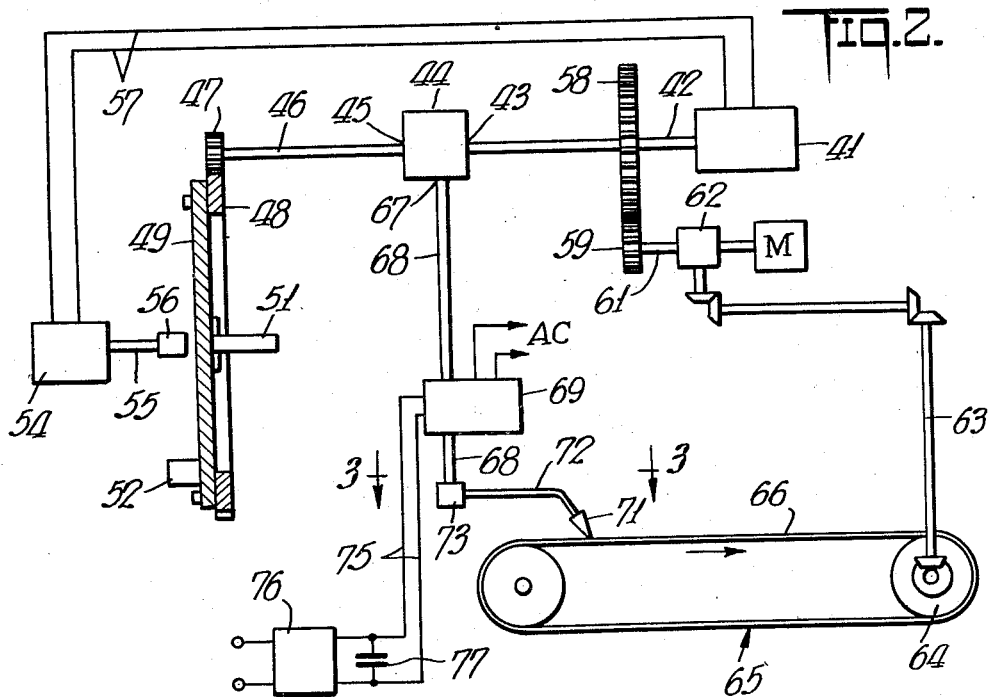
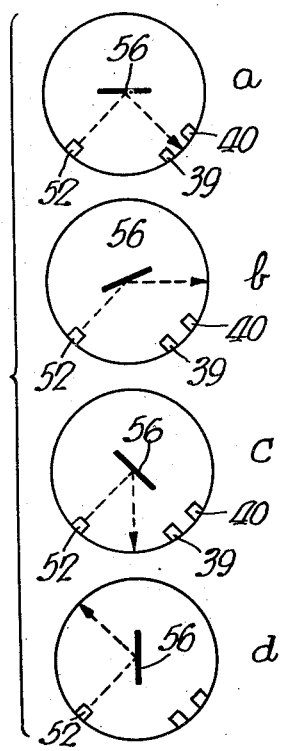
INVENTOR
John P. Glass
BY
Dean Fairbank + Hirsch
ATTORNEYS

United States Patent Office 2,858,509
Patented Oct. 28, 1958

2,858,509

ELECTRIC FOLLOWER AND TEST EQUIPMENT

John P. Glass, Clifton Heights, Pa.

Application August 12, 1954, Serial No. 449,363

16 Claims. (Cl. 324—158)

It is among the objects of the invention to provide an equipment of the above type which is relatively simple, compact and has but few parts that may be readily assembled and are not likely to become deranged and which will provide an output signal of amplitude and phase related to the position of a signal source directed against transducer means which forms part of the equipment, which equipment, in the event that the applied signal to the transducer falls below a predetermined amount, will still provide a signal related to the position of the signal source at the time its effect on the transducer means has fallen below the predetermined amount.

Another object of the invention is to provide an equipment for testing and calibrating repeater synchro units of the type that indicate angular displacement of a remotely located transmitting synchro unit, which equipment is neat, compact, having relatively simple components which may readily be assembled and which will, when energized by signals from the follower equipment, provide a permanent record of the operating characteristics of the repeater synchro under test.

According to the invention, the follower circuit comprises a multi-vibrator unit of the single acting type having the plates of its vacuum tubes connected respectively to the ends of the split primary winding of a transformer. A second transformer has its secondary winding connected at one end to the junction between the sections of the split primary windings and at its other end to a source of positive potential. The primary winding of the second transformer is adapted to be connected to a source of alternating current and the output of the follower circuit is developed across the secondary winding of the first transformer. The grid of each of the tubes is connected in series with an associated transducer unit of the type whose internal impedance varies as a function of the applied signal, and with a source of potential which may be direct or alternating.

The synchro test equipment according to the invention, comprises a master transmitting synchro which serves as a standard and the rotor of which is driven by a suitable motor which also drives the drum of a paper strip feeding unit. The rotor of the master synchro is connected to one of the inputs of a differential unit, the output of which drives a disc which, adjacent its periphery, mounts a source of light and a pair of transducers, illustratively photoelectric cells. The differential unit has an additional input connected to the rotor of a reversing motor, which rotor also controls a marking instrument adapted to rest against the paper strip. The master synchro is electrically connected in conventional manner to a repeater synchro, the shaft of which mounts a mirror axially aligned with the axis of the disc and designed to reflect light from the source toward the photoelectric cells. The reversing motor is fed by the signal from the secondary winding of the output transformer of the follower circuit in such manner that, based on the phase of such signal, the motor will turn in one direction or the other.

Figure 3:
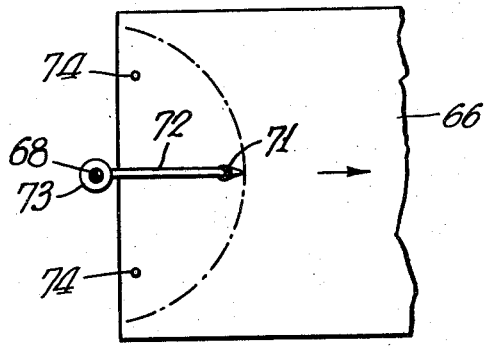

In the accompanying drawings in which are shown one or more of various possible embodiments of the several features of the invention, Fig. 1 is a circuit diagram of the follower circuit, Fig. 2 is a diagrammatic view of the synchro test equipment, Fig. 3 is a fragmentary top plan view taken along line 3—3 of Fig. 2 and, Fig. 4 is a diagrammatic view illustrating the various positions of the repeater synchro.

Referring now to the drawings, the follower circuit shown in Fig. 1 comprises a pair of vacuum tubes 10 and 11, preferably triodes which may be contained in one envelope and which form part of a single acting multi-vibrator 12. The cathodes 13 and 14 of the tubes 10 and 11 are connected by lead 15 to ground through variable resistor 16, which serves as a sensitivity control and which may have a value of 2,000 ohms.

The grids 17, 18 of tubes 10, 11 are connected respectively to ground through resistors 19 and 21 illustratively of one megohm, and the grids 17, 18 are connected to the plates 22, 23 of tubes 11, 10 through resistors 24, 25 each illustratively of 10 megohms.

The plates 22, 23 of tubes 11 and 10 are connected respectively through plate load resistors 26, 27, each illustratively of 22,000 ohms, to one side of the split primary windings P1, P1' of a transformer T1, the junction 28 between said windings P1 and P1' being connected through the secondary winding S2 of a transformer T2 to terminal 30' connected to B+. The primary P2 of transformer T2 is connected to a source of alternating current illustratively 50 volts at 400 cycles per second (C. P. S.) and the secondary S1 of transformer T1 is connected to output terminals 29 and 30.

The grids 17, 18 are connected by leads 31, 32 to terminals 33 and 34, the associated terminals 35 and 36 being connected by leads 37 and 38 to B+. Connected across each of the pairs of terminals 33, 35 and 34, 36 is a transducer 39, 40, illustratively photoelectric cells, whose internal impedance varies as a function of the applied signal.

Although the follower circuit shown in Fig. 1 may be used for any desired purpose, in Fig. 2 is illustratively shown a typical equipment with which it may be used.

The equipment shown in Fig. 2 is designed to test and calibrate a repeater unit generally known as a "Synchro" which is designed to indicate angular displacement of a remotely located master transmitting synchro.

The equipment comprises a master transmitting synchro 41 which is a precision unit that serves as a standard for the repeater synchro under test. The rotor of the synchro is connected by shaft 42 to the input 43 of a mechanical differential unit 44. The output 45 of differential unit 44 drives a shaft 46 which mounts a pinion 47 meshing with a gear 48 affixed to a disc 49.

The disc 49 is rotatably mounted on an axle 51 and on its face adjacent its periphery mounts the photoelectric cells 39, 40 which are directed toward the axle 51. Also mounted on the face of the disc is a lamp 52 which is positioned to direct light toward the axle 51.

The photoelectric cells 39, 40 and lamp 52 are suitably connected through conventional slip rings (not shown) to the terminals 33, 35 and 34, 36 and to a source of current respectively.

Positioned adjacent the disc 49 is the repeater synchro 54 to be tested. The rotor of the repeater synchro is aligned with the axle 51 and the shaft 55 driven by said rotor mounts a mirror 56 at its free end adjacent disc 49 which is designed to receive light from lamp 52 and to reflect such light to the photoelectric cells 39, 40.

The repeater synchro is electrically connected in conventional manner symbolized by leads 57 to the master synchro 41, so that upon rotation of the rotor of the master synchro, the rotor of the repeater synchro will turn a corresponding amount.

Affixed to shaft 42 is a gear 58 which meshes with a pinion 59 mounted on a shaft 61 which through gear train 62 is driven by motor M. The gear train 62, through shaft 63 also drives the drum 64 of a moving chart unit 65 so that the continuous strip of paper 66 of said unit will move in timed relation with the rotation of the master synchro by motor M.

The input 67 of differential unit 44 is connected by shaft 68 to the rotor of a conventional two phase reversing motor 69 so that depending upon the direction of rotation of motor 69 a corresponding rotation will be imparted to disc 49.

To provide the desired indication on strip 66, a pen 71 is positioned so as to rest thereagainst as shown in Fig. 2. The pen 71 is mounted at the end of an arm 72 affixed to a hub 73 mounted on the shaft 68 of motor 69. Thus, upon rotation of said motor the pen will move in an arcuate path across the paper and suitable stops 74 are provided to limit the movement of said pen.

One of the stator windings of motor 69 is connected to a source of alternating current in conventional manner. The other stator winding is connected by leads 75 to the output of an amplifier 76, the input of which is connected to terminals 29, 30 of the follower unit. A condenser 77 is connected across leads 75 so as to introduce a 90 degree phase lag in the output of the amplifier 76 to effect rotation of motor 69 in conventional manner.

To operate the equipment, the master synchro and repeater synchro shown in Fig. 2 are energized in conventional manner and the master synchro is set to zero position. The repeater synchro will thereupon become set to a position which is also calibrated as zero position.

The B+ supply is connected to terminal 30' of the follower circuit shown in Fig. 1. If the photoelectric cells 39 and 40 are not energized, due to the inherent unbalance of the multi-vibrator unit 12 including tubes 10 and 11, one of such tubes, illustratively tube 11 will conduct. As the voltage on its plate 22 will drop, the grid 17 of tube 10 will be driven negative and tube 10 will remain cut off.

With a source of alternating current applied to the primary P2 of transformer T2, since tube 10 is cut off, no current will flow in the primary winding P1, but since tube 11 is conducting, an alternating current will flow through the primary winding P1'. Hence, a voltage will be induced in the secondary winding S1 which illustratively is in phase with the phase of the alternating current applied to primary P2 of transformer T2 and has a phase angle $a$.

The mirror 56 on shaft 55 is adjusted until the intensity of the light reflected from lamp 52 to each of the photoelectric cells 39 and 40 is equal. As both of the photoelectric cells, when energized by the light, will draw current, the grids 17 and 18 of tubes 10 and 11 will both become positive. When the grid 17 of tube 10 becomes positive, the grid 18 of tube 11 will tend to become negative, but since there is a high resistance in the order of 10 megohms in the plate to grid circuit of tubes 10 and 11 respectively, only a relatively small negative signal will be applied to the grid 18 of tube 11, which is overcome by the positive signal applied to grid 18 due to the conduction of the associated photoelectric cell 40.

Thus, both tubes 10 and 11 will conduct, the amount of current flowing being a factor of the setting of resistor 16 which regulates the bias on tubes 10 and 11 and hence the sensitivity of the unit. If the light intensity to both photoelectric cells is identical, as the current flowing through primary windings P1 and P1' will be identical and opposite in phase, they will cancel with the result that there will be zero output from the secondary of transformer T1.

As the output terminals 29 and 30 of transformer T1 are connected through amplifier 76 to the input of reversing motor 69, since no signal will be applied to motor 69 it will not be energized and no movement will be imparted to its shaft 68 and pen 71 driven thereby.

After the light intensity has been adjusted until the pen 71 is stationary, indicating that the intensity of the light reflected to both photoelectric cells 39 and 40 is equal, the pen is adjusted so that it is aligned with a center-line on strip 66 as shown in Fig. 3.

The equipment is now ready to calibrate the repeater synchro 54. To this end, motor M is energized so that it will rotate continuously and through gear train 62 it rotates the shafts 61 and 63 at a relatively slow rate of speed. Through pinion 59 and gear 58 the shaft 42 will be rotated to turn the rotor of the master synchro 41 and the input 43 of differential unit 44. Consequently, as the input 67 is held stationary by motor 69 which is not energized, shaft 46 will rotate at the same rate of speed and in the same direction as shaft 42 and through pinion 47 and gear 48 the disc 49 will also be rotated. In addition, the shaft 63 will drive drum 64 to advance the paper strip 66 so that the pen 71 will make a line thereon.

As the rotor of the master synchro 41 is turned, it will turn the rotor of the repeater synchro 54, as well as the mirror 56 driven thereby, in the same direction as disc 49.

If the repeater synchro 54 is exactly following the master synchro 41, the relative position between lamp 52 and mirror 56 will remain unchanged and equal light will still be reflected to the photoelectric cells 39, 40 so that the output of transformer T1 will be zero and motor 72 will remain de-energized.

As a result, the pen 67 will remain aligned with the center of strip 66 and as the latter is advanced by drum 64 a straight line will be drawn on the strip.

If the repeater synchro 54 should lag behind the master synchro 41 as shown in Fig. 4b, then the relative position of lamp 52 and mirror 56 will change so that more light will be reflected onto photoelectric cell 40 than onto photoelectric cell 39, for example.

If the light intensity is still sufficient to render both tubes 10 and 11 conductive, as grid 18 will be more positive than grid 17 due to greater current flow through its associated photoelectric cell 40, then the current flow through winding P1' of transformer T1 will be greater than through winding P1 and the voltage across winding P1' will be greater than that across winding P1 and the two voltages will be 180 degrees apart in phase.

Thus, the voltage across the output terminals 29 and 30 of secondary winding S1 will be the difference between the voltages across windings P1 and P1' and of phase determined by the winding P1' and such phase for purpose of illustration is assumed to be the same as that of the alternating current applied to secondary winding P2 of transformer T2 and to the motor 69.

Such voltage is amplified by amplifier unit 76 and by reason of condenser 77, caused to lag 90 degrees behind the phase of the energizing voltage applied to motor 69. Hence such motor will be energized to cause its rotor to turn in direction to cause shaft 68 to turn, say in a clockwise direction from the position shown in Fig. 3. As the shaft 68 drives the pen 71, it will cause the latter to move in a clockwise direction from the normal center line to make a corresponding line on the moving strip 66 which is calibrated to indicate the angular position of rotation of the master synchro 41 at which the repeater synchro 54 lags.

The rotation of shaft 68 will also effect the input 67 of differential unit 44 so that the speed of rotation of shaft 46 will slow down. As a result, the intensity of the light reflected to the photoelectric cells 39 and 40 will equalize and when this occurs, there will be zero output from terminals 29 and 30, the motor 69 will be de-energized and the pen 71 will remain displaced from the center line indicating that the repeater synchro lagged behind the master synchro.

If at this time, the repeater synchro 54 caught up with the master synchro 41, the relative position between mirror 56 and the photoelectric cells would again change, but this time in the opposite direction as shown in Fig. 4c, so that more light will be reflected onto photoelectric cell 39 than onto photoelectric cell 40. If the light intensity is still sufficient to render both tubes 10 and 11 conductive, as grid 17 will be more positive than grid 18 due to greater current flow through its associated photoelectric cell 39, then the current flow through winding P1 of transformer T1 will be greater than through winding P1' and the voltage across winding P1 will be greater than that across winding P1' and these voltages will be 180 degrees apart in phase.

Thus the voltage across the output terminals 29 and 30 of secondary winding S1 will be the difference between the voltages across the windings P1 and P1', but of phase determined by the winding P1 and such phase is 180 degrees out of phase with the phase of the voltage across winding P1' and also 180 degrees out of phase with the alternating current applied to secondary winding 52 of transformer T2 and to motor 72.

Hence when this voltage is amplified and caused to lag 90 degrees by condenser 77, it will lead 90 degrees ahead of the phase of the energizing voltage applied to motor 69. Hence such motor will be energized to cause its rotor to turn in direction to cause shaft 68 to turn in a counterclockwise direction from the position shown in Fig. 3. This will cause the pen 67 to move in a counterclockwise direction toward the center line from its previous position (indicating a lag), to make a corresponding line on the moving strip 66.

As previously described, the rotation of shaft 68 will also effect the input of differential unit 44, but this time to increase the speed of rotation of shaft 46. As a result, the intensity of the light reflected to the photoelectric cells 39 and 40 will again equalize and when this occurs there will be zero output from terminals 29 and 30 and motor 69 will be de-energized. As motor 69 rotated, shaft 68 moved pen 71 from its outward position back to the center line to make a corresponding line on strip 66 which now indicates that the master and repeater synchros are in step.

As the operation of the unit in the event the repeater synchro initially leads the master synchro is substantially the same as above described it will not be discussed.

In the event that the repeater synchro 54 should lead or lag the master synchro by such an amount that insufficient light reaches either of the photoelectric cells 39 or 40 to energize the latter then the system above described has a "memory" to retain the information as to whether the repeater synchro is leading or lagging.

Thus, assuming for example that the repeater synchro is lagging, as previously described, the grid 18 of tube 11 was rendered more positive than the grid 17 of tube 10. As the repeater synchro increases its lag, the positive potential on the grid 17 of tube 10 will decrease until this tube cuts off. When the photoelectric cell 40 thereupon becomes de-energized by reason of insufficient light thereto due to further lag of the repeater synchro, as tube 11 had been previously conducting, it will remain conducting so that the voltage across winding P1' and the phase of such voltage will control the output from secondary winding S1. Hence the motor 69 will be energized in direction to indicate a lag and this will be indicated on the moving strip 66.

Similarly if the repeater synchro should lead the master synchro, the photoelectric cell 39 will be last energized and the voltage across winding P1 and the phase of such voltage will control the output of secondary winding S1 so that the motor 69 will be energized in direction to indicate a lead and this will be indicated on the moving strip 66.

In the event the rotor of the repeater synchro should jam at some angular position due to dirt or dust and thereupon quickly release and follow the master synchro, as only one of the photoelectric cells may be energized at this time, the voltage across the output terminals 29, 30 will be maximum. Hence, the motor 69 will operate rapidly so that the line drawn on the moving strip will extend substantially at right angles from the center line.

As previously described, the disc 49 will slow down so that the intensity of the light to the two photoelectric cells will equalize. Thereupon, as the rotor of the repeater synchro then quickly gets in step with the rotor of the master synchro, the motor 69 will reverse and as the output from the terminals 29 and 30 will also be maximum the pen will move back quickly to its center line position, thus drawing a line that also is substantially at right angles to the center line.

With the equipment above described, by inspection of the chart, the characteristics of the repeater synchro may readily be determined and where relatively straight lines are present at substantially right angles to the center line, an indication is afforded of momentary jamming of the rotor of the repeater synchro.

Although the follower circuit shown in Fig. 1 is shown as the control for the calibration equipment of Fig. 2, it is of course to be understood that it can be used in any similar system. Furthermore, although the transducers illustratively shown are photoelectric cells, capacitors could be used in place of such photoelectric cells. In such case, the capacitors would be connected between the grids of the tubes 10 and 11 and a source of alternating potential.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limting sense.

Having thus described my invention, what I claim as new and desire to secure by Letters Patent of the United States is:

1. A follower circuit comprising a multi-vibrator of the single acting type having a pair of vacuum tubes each having a control grid, a cathode, and a plate, a transformer having a split primary winding having two sections, said sections being connected together at one end and having their other ends connected respectively to the plates of said tubes and a secondary output winding coupled to said primary winding, a second transformer having a secondary winding having one end connected to the junction between the two sections of the split primary winding of the first transformer and a primary winding adapted to be connected to a source of alternating current, and means to connect a source of positive potential to the plates of said tubes, and means to form a return path for said source of positive potential.

2. A follower circuit comprising a multi-vibrator of the single acting type having a pair of vacuum tubes, each having a control grid, a cathode and a plate, a transformer having a split primary winding having two sections, said sections being connected together at one end and having their other ends connected respectively to the plates of said tubes and a secondary winding coupled to said primary winding, means to induce a flow of alternating current through said primary winding, means to connect a source of positive potential to the plates of said tubes, means to form a return path for said source of positive potential, and means to connect an electircal unit of the type whose internal impedance varies as a function of the applied signal between the control grids of the respective tubes and a source of potential said electrical unit controlling said multi-vibrator.

3. A follower circuit comprising a multi-vibrator of the single acting type having a pair of vacuum tubes, each having a control grid, a cathode, and a plate, a transformer having a split primary winding having two sections, said sections being connected together at one end and having their other ends connected respectively to the plates of said tubes and a secondary output winding coupled to said primary winding, a second transformer having a secondary winding connected at one end to the junction between the two sections of the split primary winding of the first transformer and a primary winding adapted to be connected to a source of alternating current, means to connect a source of positive potential to the plates of said tubes, means to form a return path for said source of positive potential, a pair of electrical units of the type whose internal impedance varies as a function of the applied signal and means to connect said electrical units between the control grids of the respective tubes and a source of potential.

4. The combination recited in claim 3 in which a resistor is connected in series with each of the plates and the associated section of the split primary winding.

5. The combination recited in claim 3 in which a variable resistor is connected in series with said cathodes and the return for said source of positive potential.

6. The combination set forth in claim 3 in which each electrical unit is a photoelectric cell and the source of potential is direct current.

7. The combination set forth in claim 3 in which each electrical unit is a capacitor and the source of potential is alternating current.

8. Equipment for testing the response of a synchro repeater with respect to a master transmitting synchro to which it is electrically connected, comprising a disc, means rotatably mounting said disc, a drive motor to rotate said disc and said master transmitting synchro, a light source mounted on said disc adjacent its periphery and directed toward the axis thereof, a pair of photoelectric cells mounted on the periphery of said disc, circumferentially spaced from said light source and directed toward the axis of said disc, a follower circuit comprising a multi-vibrator of the single acting type having a pair of vacuum tubes each having a control grid and a plate, a transformer having a split primary winding connected at each end to the plates of said respective tubes and a secondary output winding coupled to said primary winding, means to induce a flow of alternating current through said primary winding, means to connect a source of positive potential to the plates of said tubes, means to connect one side of each of said photoelectric cells to the control grids of said tubes respectively, means to connect the other side of said photoelectric cell to the source of positive potential, a reversing motor, means connecting the secondary output winding to said motor, means to connect an alternating current source to said motor, an indicator controlled by said motors, means controlled by said reversing motor to vary the direction of rotation of said disc and a mirror positioned adjacent the axis of said disc to reflect light from said source to said photoelectric cells, said mirror being controlled by said repeater synchro.

9. The combination set forth in claim 8 in which the means to induce a flow of alternating current through said primary winding comprises a second transformer having a secondary winding connected at one end to the junction between the sections of the split primary winding of the first transformer and at its other end to the source of positive potential and a primary winding adapted to be connected to a source of alternating current.

10. The combination set forth in claim 9 in which the reversing motor is of the two phase type having a pair of stator windings, one of said windings being adapted to be connected to the source of alternating current for the primary winding of the second transformer and the other of said windings being connected to the secondary output winding, a capacitor being connected across the other of said windings.

11. The combination set forth in claim 8 in which said repeater synchro has a shaft axially aligned with the axis of said disc and said mirror is driven by said shaft.

12. The combination set forth in claim 8 in which a transmission is provided between the drive motor and the disc, said transmission including a differential unit having an input driven by said motor, an output driving said disc and a second input driven by said reversing motor.

13. The combination set forth in claim 8 in which the indicator comprises a continuous strip, a drum connected to said drive motor to advance said strip, a marking instrument normally engaging said disc and controlled by said reversing motor, said marking instrument being movable in an arcuate path with respect to said strip at substantially right angles to the path of movement thereof.

14. An electrical circuit for detecting and remembering a signal such as light, magnetism, or electrical potential, comprising a multivibrator of adjustable stability, and variable impedance means connected in circuit with said multivibrator for controlling its stability, the impedance of said impedance means increasing when the signal is lost to render the multivibrator unstable so that it retains the directional sense of the last detected signal.

15. A follower circuit comprising means for detecting a signal such as light, magnetism, or electrical potential; means for following said signal by driving a device in response thereto; and means, upon said signal moving faster than the detecting means which follows it so that said signal disappears and is lost to the detecting means, for remembering the direction of the last detected signal and for causing the detecting means to follow in the proper direction to rediscover the lost signal.

16. The circuit defined in claim 15 wherein said follower and remembering means include a multivibrator of adjustable stability; and said detecting means includes variable impedance elements which are connected in circuit with said multivibrator and control the stability of said multivibrator, the impedance of said impedance elements increasing when the signal is lost thereby rendering said multivibrator unstable so that it retains the directional sense of the last detected signal and drives said device and the detecting means in the proper direction to rediscover the lost signal.

References Cited in the file of this patent

UNITED STATES PATENTS 2,559,513   Palmer _____ July 3, 1951